United States Patent
Ono et al.

(10) Patent No.: US 11,936,218 B2
(45) Date of Patent: Mar. 19, 2024

(54) CHARGING CONTROL DEVICE, BATTERY SYSTEM AND CHARGING CONTROL METHOD

(71) Applicant: YAZAKI CORPORATION, Tokyo (JP)

(72) Inventors: Chihiro Ono, Susono (JP); Takahiro Syouda, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 400 days.

(21) Appl. No.: 17/465,793

(22) Filed: Sep. 2, 2021

(65) Prior Publication Data
US 2022/0077694 A1 Mar. 10, 2022

(30) Foreign Application Priority Data
Sep. 7, 2020 (JP) ................................. 2020-149613

(51) Int. Cl.
*H02J 7/00* (2006.01)
(52) U.S. Cl.
CPC ...... *H02J 7/0016* (2013.01); *H02J 7/007182* (2020.01)
(58) Field of Classification Search
USPC ........................................ 320/116–119, 137
See application file for complete search history.

(56) References Cited

U.S. PATENT DOCUMENTS

| 2011/0074354 A1* | 3/2011 | Yano | H01M 10/482 180/65.29 |
| 2012/0091964 A1* | 4/2012 | Vance | B60L 3/0046 320/122 |
| 2013/0302657 A1 | 11/2013 | Itakura | |

FOREIGN PATENT DOCUMENTS

| JP | 2013-031247 A | 2/2013 |
| JP | 2013-240155 A | 11/2013 |

* cited by examiner

*Primary Examiner* — Samuel Berhanu
(74) *Attorney, Agent, or Firm* — KENEALY VAIDYA LLP

(57) ABSTRACT

A charging control device is to charge a battery device including a battery group including storage battery systems, in which batteries are connected in series, connected in parallel, system switches and bypass switches. The charging control device includes a control device to control the system switches and the bypass switches to control charging of the battery device. The control device determines an individual charging completion total voltage, obtains system remaining charge predetermined capacities for each of total voltages of the storage battery systems to reach the individual charging completion total voltage, charge the battery systems individually such that each of the total voltages of the first and second storage battery systems reaches the individual charging completion total voltage while making remaining charge capacities of batteries uniform to be the system remaining charge predetermined capacities and perform collective charging of the storage battery systems after individually charging storage battery systems.

7 Claims, 5 Drawing Sheets

US 11,936,218 B2

CHARGING CONTROL DEVICE, BATTERY SYSTEM AND CHARGING CONTROL METHOD

CROSS-REFERENCE TO RELATED APPLICATION

The present application claims priority to Japanese Patent Application No. 2020-149613 filed on Sep. 7, 2020, the entire content of which is incorporated herein by reference.

TECHNICAL FIELD

The present invention relates to a charging control device, a battery system, and a charging control method.

BACKGROUND

In a related art battery device, a plurality of batteries are connected in series via switches, and switches for being connected to a bypass line that bypasses each battery are provided. The battery device can bypass a specific battery by controlling the switch for being connected to the bypass line (for example, see JP 2013-031247A).

In a battery device of another related art, a plurality of battery cell rows in which a plurality of battery cells are connected in series are connected in parallel with each other to form a battery cell group. Since the battery device has a plurality of storage battery systems each including a battery cell row in parallel, the battery device can operate with a large output by performing parallel operation (for example, see JP 2013-240155A).

Here, in case of cascade use of batteries in which used batteries that have been used for in-vehicle applications and the like are collected and used in an integral manner to form a large vehicle storage battery, a stationary battery system, and the like, there is a problem that a deterioration state of each battery differs depending on a past usage method of a battery user. Therefore, as described in JP 2013-031247A, a configuration in which each battery can be bypassed is conceivable. With such a configuration, it is possible to bypass only specific batteries, and for example, it is possible to bypass only a battery having a small battery capacity and use other batteries connected in series with each other. Further, as described in JP 2013-240155A, a plurality of storage battery systems in which a plurality of battery cells are connected in series are provided in parallel, so that the parallel operation can be performed to obtain a large output.

However, in a configuration in which the battery device of the related art is adopted, when the battery is bypassed during a progress of charging, a total voltage of the storage battery system in which the bypassing has been carried out decreases, which brings about a difference in its total voltage from a total voltage of another storage battery system.

In addition, when charging is performed for each storage battery system separately or individually, a difference occurs in the total voltage of the storage voltages, and if the parallel operation is performed when a charging mode is unexpectedly switched to a discharging mode, a circulating current flows between the systems.

That is, when a difference occurs in the total voltage, a circulating current, which is determined by a potential difference between the systems and a resistance component such as an internal resistance of a battery cell, a cut-off switch, a bus bar, a wiring, etc., flows between the systems. For example, when the potential difference is 4 V and the resistance component is 100 mΩ, a circulating current of 40 A flows. At this time, when a cell or a circuit component which cannot accept the circulating current is included in the system in which the circulating current flows, the systems cannot be connected in parallel with each other.

In addition, even if the circulating current falls within a charge-discharge current limit value of the battery cell or a limit value of each circuit component and the parallel connection can be performed, the circulating current may be increased and the circulating current may not be accepted because the total voltage of the corresponding system is decreased by an amount corresponding to an open circuit voltage of a bypassed cell each time the charging proceeds after transitioning to a next charging mode and the fully charged cell is bypassed.

SUMMARY

Illustrative aspects of the present invention provide a charging control device, a battery system, and a charging control method configured to reduce a possibility that a circulating current cannot be accepted at the time of parallel connection in a case where a plurality of storage battery systems in which a plurality of batteries are connected in series are provided in parallel.

According to an illustrative aspect of the present invention, a charging control device is configured to charge a battery device. The battery device includes a battery group including a first storage battery system in which a plurality of first batteries are connected in series with each other and a second storage battery system in which a plurality of second batteries are connected in series with each other, the first and second storage battery systems being connected in parallel with each other, a plurality of system switches each configured to electrically connect and disconnect one of the first and second storage battery systems to and from the charging control device and a plurality of bypass switches each configured to bypass each of the plurality of first and second batteries. The charging control device includes a control device configured to control the system switches and the bypass switches to control charging of the battery device. The control device is configured to determine an individual charging completion total voltage being a total voltage as a common charging target for both the first and second storage battery systems, obtain a first system remaining charge predetermined capacity being a target value of a remaining charge capacity of each of the plurality of first batteries and a second system remaining charge predetermined capacity being a target value of a remaining charge capacity of each of the plurality of second batteries, for each of total voltages of the first and second storage battery systems to reach the individual charging completion total voltage, charge each of the first and second storage battery systems individually such that each of the total voltages of the first and second storage battery systems reaches the individual charging completion total voltage while making the remaining charge capacities of each of the plurality of first and second batteries uniform to be respective one of the first and second system remaining charge predetermined capacities and perform collective charging of the first and second storage battery systems together after charging each of the first and second storage battery systems individually.

According to another illustrative aspect of the present invention, a battery system includes a battery device which includes a battery group including a first storage battery system in which a plurality of first batteries are connected in series with each other and a second storage battery system in which a plurality of second batteries are connected in series with each other, the first and second storage battery systems being connected in parallel with each other; a plurality of system switches each configured to electrically connect and disconnect one of the first and second storage battery systems to and from the charging control device and a plurality of bypass switches each configured to bypass each of the plurality of first and second batteries and the charging control device.

According to yet another illustrative aspect of the present invention, a charging control method for a charging control device configured to charge a battery device is provided. The battery device includes a battery group including a first storage battery system in which a plurality of first batteries are connected in series with each other and a second storage battery system in which a plurality of second batteries are connected in series with each other, the first and second storage battery systems being connected in parallel with each other, a plurality of system switches each configured to electrically connect and disconnect one of the first and second storage battery systems to and from the charging control device and a plurality of bypass switches each configured to bypass each of the plurality of first and second batteries. The charging control method includes controlling the system switches and the bypass switches to control charging of the battery device. The controlling includes determining an individual charging completion total voltage being a total voltage as a common charging target for both the first and second storage battery systems, obtaining a first system remaining charge predetermined capacity being a target value of a remaining charge capacity of each of the plurality of first batteries and a second system remaining charge predetermined capacity being a target value of a remaining charge capacity of each of the plurality of second batteries, for each of total voltages of the first and second storage battery systems to reach the individual charging completion total voltage, charging each of the first and second storage battery systems individually such that each of the total voltages of the first and second storage battery systems reaches the individual charging completion total voltage while making the remaining charge capacities of each of the plurality of first and second batteries uniform to be respective one of the first and second system remaining charge predetermined capacities and after the charging of each of the first and second storage battery systems individually, performing collective charging of the first and second storage battery systems together.

Other aspects and advantages of the invention will be apparent from the following description, the drawings and the claims.

DESCRIPTION OF EMBODIMENTS

While the present invention has been described with reference to certain exemplary embodiments thereof, the scope of the present invention is not limited to the exemplary embodiments described above, and it will be understood by those skilled in the art that various changes and modifications may be made therein without departing from the scope of the present invention as defined by the appended claims.

Figure 1:
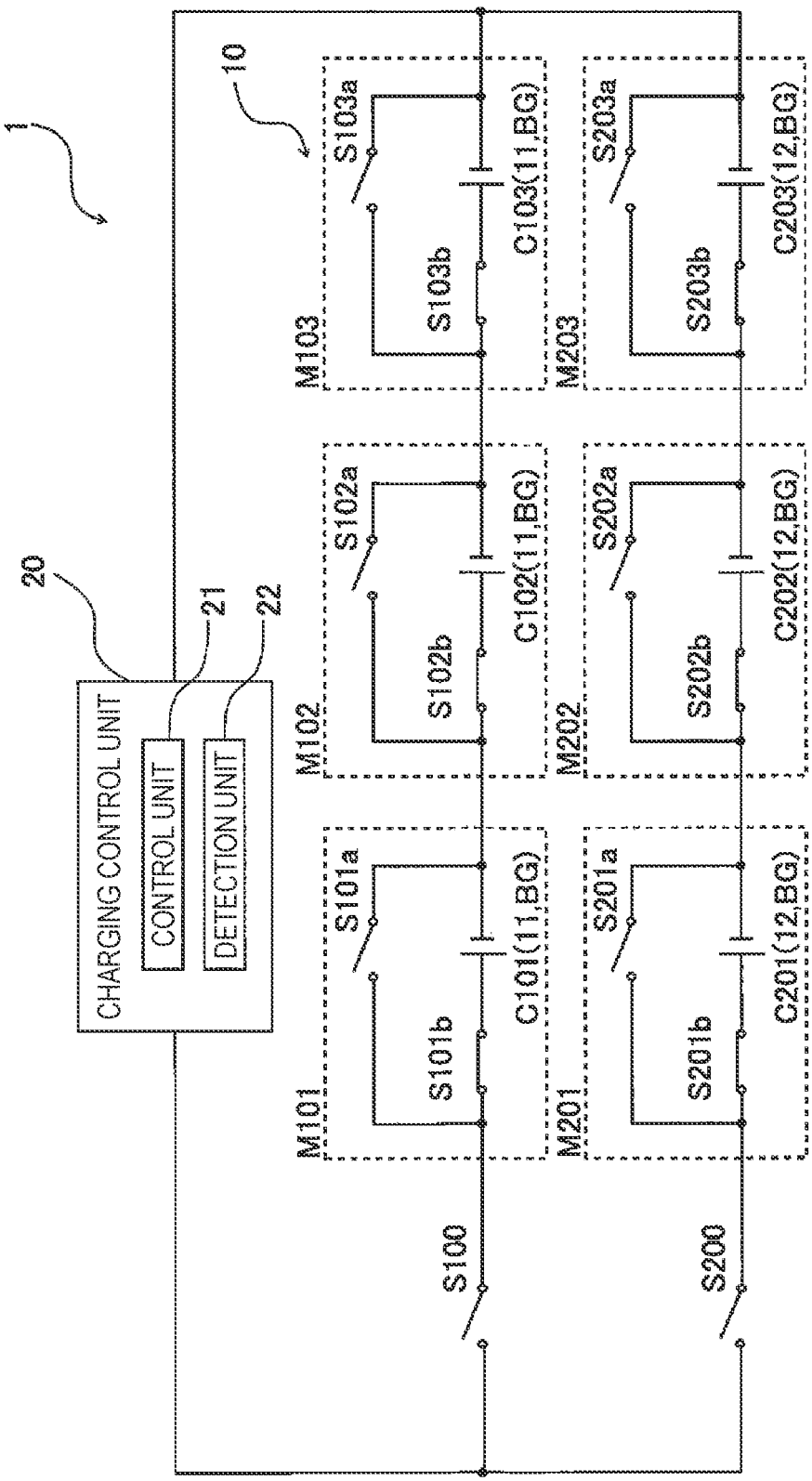
FIG. 1 is a configuration diagram showing a battery system according to the present embodiment.

FIG. 1 is a configuration diagram showing a battery system according to the present embodiment. A battery system 1 shown in FIG. 1 is configured to keep a circulating current at the time of parallel connection within an allowable range, and includes a battery device 10 and a charging control unit (charging control device) 20.

The battery device 10 includes a battery group BG (a group of batteries), a plurality of (two in FIG. 1) system switches S100 and S200, a plurality of parallel switches (bypass switches) S101a to S103a and S201a to S203a, and a plurality of series switches (bypass switches) S101b to S103b and S201b to S203b.

The battery group BG includes a plurality of (two in FIG. 1) storage battery systems 11 and 12 provided in parallel with each other. In a first storage battery system 11, a plurality of (three in FIG. 1) batteries C101 to C103 (a plurality of first batteries) are connected in series with each other via the plurality of series switches S101b to S103b. In a second storage battery system 12, a plurality of (three in FIG. 1) batteries C201 to C203 (a plurality of second batteries) are connected in series with each other via the plurality of series switches S201b to S203b. Each of the batteries C101 to C103 and C201 to C203 is a used battery (which may be a unit cell or a battery including a plurality of cells) that has been used for in-vehicle use or the like and collected. For example, the batteries C101 to C103 and C201 to C203 may be configured by batteries whose deterioration states have been measured and whose deterioration states are similar to each other, or may be configured by batteries whose deterioration states are different from each other. The battery group BG is configured to satisfy a voltage or the like required for a target use application in consideration of a deterioration state of each of the batteries C101 to C103 and C201 to C203.

The plurality of system switches S100 and S200 are provided on a path from the charging control unit 20 to each of the storage battery systems 11 and 12, and configured to switch electrical connection and disconnection between each of the storage battery systems 11 and 12 and the charging control unit 20.

The plurality of parallel switches S101a to S103a and S201a to S203a and the plurality of series switches S101b to S103b and S201b to S203b are switches configured to respectively bypass the plurality of batteries C101 to C103 and C201 to C203 forming the storage battery systems 11 and 12. When any of the plurality of batteries C101 to C103 and C201 to C203 is not bypassed, the plurality of series switches S101b to S103b and S201b to S203b are turned on (in a connected state), and the plurality of parallel switches S101a to S103a and S201a to S203a are turned off (in a disconnected state). On the other hand, when any one of the plurality of batteries C101 to C103 and C201 to C203 is bypassed, a respective one of the plurality of series switches S101b to S103b and S201b to S203b is turned off, and a respective one of the plurality of parallel switches S101a to S103a and S201a to S203a is turned on.

As shown in FIG. 1, in the battery system 1 according to the present embodiment, the batteries C101 to C103 and C201 to C203, the parallel switches S101a to S103a and S201a to S203a, and the series switches S101b to S103b and S201b to S203b are respectively combined to form each of the battery modules M101 to M103 and M201 to M203.

The charging control unit 20 includes a control unit (control device) 21 configured to control the switches S100, S200, S101a to S103a, S201a to S203a, S101b to S103b, and S201b to S203b. The charging control unit 20 may be connected to, for example a commercial power supply via a DC to AC inverter or another DC power supply, and the control unit 21 controls charging of the battery device 10 using these power supplies. The charging control unit 20 also includes a detection unit 22 configured to detect the voltages of the batteries C101 to C103 and C201 to C203 or to acquire information from a device that detects the voltages.

Further, in the present embodiment, the control unit 21 is configured to charge the storage battery systems 11 and 12 individually to make the total voltages of the storage battery systems 11 and 12 equal to each other, and then performs collective charging of the storage battery systems 11 and 12 together. In the individual charging, the control unit 21 (1) determines an individual charging completion total voltage $V_{IT}$, which is a total voltage serving as the same/common charging target for the plurality of storage battery systems 11 and 12, and (2) charges each of the storage battery systems 11 and 12 up to the individual charging completion total voltage $V_{IT}$ (first condition). As a result, the control unit 21 makes the total voltages of each of the storage battery systems 11 and 12 equal to the individual charging completion total voltage $V_{IT}$. Thereafter, the control unit 21 collectively charges the plurality of storage battery systems 11 and 12.

In particular, in the individual charging, the control unit 21 is configured to perform charging so as to satisfy not only the above mentioned first condition but also a second condition. The second condition is that remaining charge capacities of the plurality of batteries C101 to C103 in the system 11 and the plurality of batteries C201 to C203 in the system 12 are made equal. Therefore, in the individual charging, the control unit 21 controls the switches S101a to S103a, S201a to S203a, S101b to S103b, and S201b to S203b so as to bypass one of the plurality of batteries C101 to C103 and C201 to C203 that has reached the target remaining charge capacity.

More specifically, the control unit 21 determines the individual charging completion total voltage $V_{IT}$ of the first condition as follows.

First, the control unit 21 specifies a battery having the smallest remaining charge capacity among the batteries C101 to C103 and C201 to C203 of the storage battery systems 11 and 12 (specifies a battery that is most charged among the batteries C101 to C103 and C201 to C203) based on voltage values and the like of the batteries C101 to C103 and C201 to C203. In the example shown in FIG. 1, the control unit 21 specifies a battery having the smallest remaining charge capacity among the batteries C101 to C103 of the first storage battery system 11, and specifies a battery having the smallest remaining charge capacity among the batteries C201 to C203 of the second storage battery system 12.

Next, the control unit 21 calculates, as a minimum adjusted system total voltage VAT, a total voltage in the system 11 or 12 when other batteries C101 to C103 of the system 11 or other batteries C201 to C203 of the system 12 are charged to the same remaining charge capacity. For example, when the $1^{st}$ first battery C101 has the smallest remaining charge capacity in the first storage battery system 11, the control unit 21 calculates a first minimum adjusted system total voltage $V_{AT1}$, which is a total voltage of the first storage battery system 11 when the $2^{nd}$ first battery C102 and the $3^{rd}$ first battery C103 are charged to have the same remaining charge capacity as the $1^{st}$ first battery C101. Similarly, when the $1^{st}$ second battery C201 has the smallest remaining charge capacity in the second storage battery system 12, the control unit 21 calculates a second minimum adjusted system total voltage $V_{AT2}$, which is a total voltage of the second storage battery system 12 when the $2^{nd}$ second battery C202 and the $3^{rd}$ second battery C203 are charged to have the same remaining charge capacity as the $1^{st}$ second battery C201.

Next, the control unit 21 is configured to set the higher value between the minimum adjusted system total voltages $V_{AT1}$ and $V_{AT2}$ respectively calculated for the storage battery systems 11 and 12 as the individual charging completion total voltage $V_{IT}$. That is, the first minimum adjusted system total voltage $V_{AT1}$ and the second minimum adjusted system total voltage $V_{AT2}$ are compared with each other, and the higher one is adopted as the individual charging completion total voltage $V_{IT}$.

As described above, the control unit 21 determines the individual charging completion total voltage $V_{IT}$ so that the individual charging ends most quickly in reality. That is, the individual charging completion total voltage $V_{IT}$ is determined so that one of the batteries C101 to C103 and C201 to C203 in the plurality of storage battery systems 11 and 12 is not charged, and thus the individual charging ends most quickly in reality.

Further, the control unit 21 executes the following control with respect to the second condition. First, the control unit 21 obtains a system remaining charge predetermined capacity SRC, which is a target value of the remaining charge capacity of each of the plurality of batteries C101 to C103 and C201 to C203 in the storage battery systems 11 and 12 for reaching the individual charging completion total voltage $V_{IT}$.

Figure 2A:
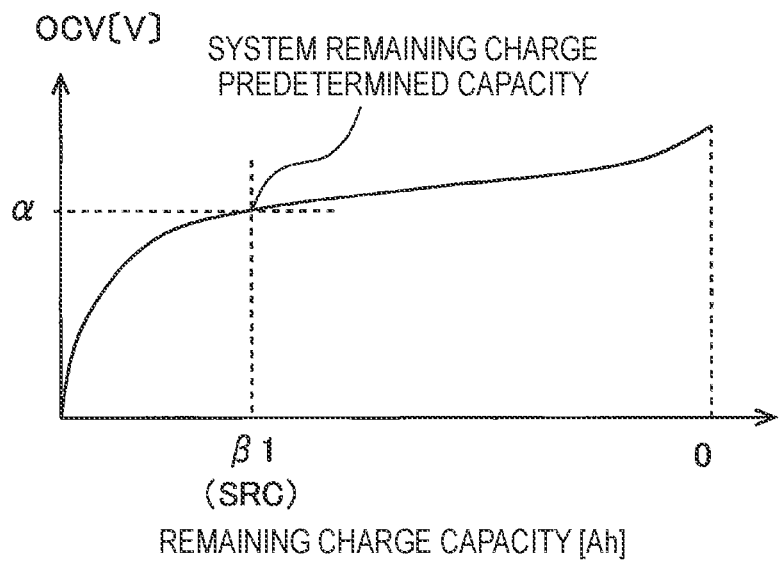
FIG. 2A is a correlation diagram showing a correlation between an open circuit voltage and a remaining charge capacity before deterioration.
Figure 2B:
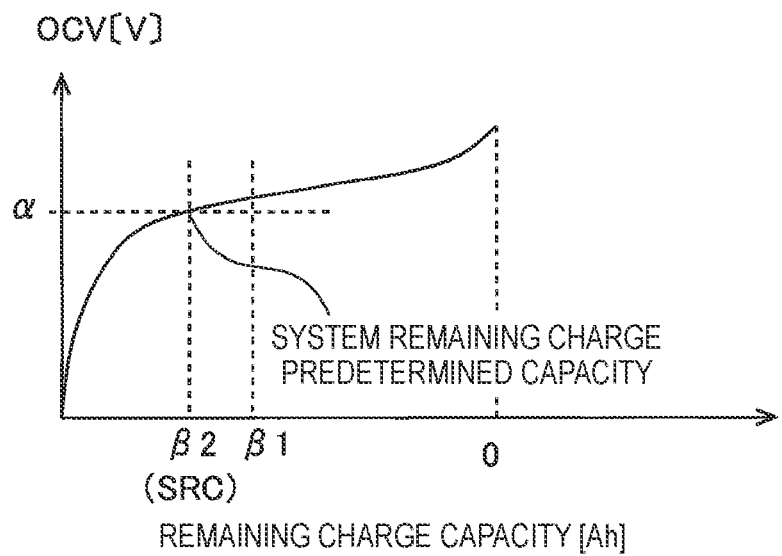
FIG. 2B is a correlation diagram showing the correlation between the open circuit voltage and the remaining charge capacity after specific deterioration.

FIG. 2A is a correlation diagram showing a correlation between an open circuit voltage and a remaining charge capacity before deterioration, and FIG. 2B is a correlation diagram showing the correlation between the open circuit voltage and the remaining charge capacity after specific deterioration. The above will be described with an example. First, when the individual charging completion total voltage $V_{IT}$ corresponds to $3\alpha$ V, the number of the batteries C101 to C103 is three in the example shown in FIG. 1, and therefore, each of the batteries C101 to C103 is required to be $\alpha$ V, for example. In order to obtain an open circuit voltage of $\alpha$ V in a state before deterioration shown in FIG. 2A, the remaining charge capacity is required to be $\beta 1$ as shown in FIG. 2A. However, in the present embodiment, since a used battery is supposed to be used, deterioration has progressed to some extent. As the deterioration progresses, the correlation diagram is compressed in the horizontal axis direction shown in FIG. 2A, and in order to obtain the open circuit voltage of $\alpha$ V, the remaining charge capacity is required to be $\beta 2$ as shown in FIG. 2B. The control unit 21 acquires correlation data between the open circuit voltage and the remaining charge capacity (that is, data as shown in FIG. 2A) and information on a deterioration rate, for each of the batteries C101 to C103 of the first storage battery system 11 in advance, and derives a correlation as shown in FIG. 2B based on the correlation data and the information. As a result, the control unit 21 can calculate the remaining charge capacity β2, and obtains the remaining charge capacity β2 as the system remaining charge predetermined capacity SRC.

The control unit 21 obtains the system remaining charge predetermined capacity SRC for each of the storage battery systems 11 and 12 (that is, obtains a system remaining charge predetermined capacity SRC1 of the first storage battery system 11, i.e., a first system remaining charge predetermined capacity, and a system remaining charge predetermined capacity SRC2 of the second storage battery system 12, i.e., a second system remaining charge predetermined capacity), sequentially bypasses a battery among the batteries C101 to C103 or C201 to C203 whose remaining charge capacity has reached the system remaining charge predetermined capacity SRC1 or SRC2, and completes the individual charging in the system 11 or 12 when the remaining charge capacities of all of the plurality of batteries C101 to C103 or C201 to C203 have reached the system remaining charge predetermined capacity SRC1 or SRC2. As a result, in the storage battery systems 11 and 12, the remaining charge capacities of the batteries C101 to C103 or C201 to C203 are made uniform to become the system remaining charge predetermined capacity SRC1 or SRC2 (the remaining charge capacities of the batteries C101 to C103 become the system remaining charge predetermined capacity SRC1, and the remaining charge capacities of the batteries C201 to C203 become the system remaining charge predetermined capacity SRC2), and then the individual charging completion total voltage $V_{IT}$ is reached so as to complete the individual charging. The system remaining charge predetermined capacity SRC1 of the first storage battery system 11 and the system remaining charge predetermined capacity SRC2 of the second storage battery system 12 may have the same value or different values as a result of the calculation.

As described above, when the individual charging is completed, the problem of the circulating current due to a potential difference between the storage battery systems 11 and 12 is solved. In particular, since the remaining charge capacities of the plurality of batteries C101 to C103 and C201 to C203 are made uniform, even in the subsequent collective charging, theoretically, a case where a certain battery among the batteries C101 to C103 and C201 to C203 is first fully charged and bypassed can be prevented. Therefore, after the total voltages of the storage battery systems 11 and 12 are made equal, the circulating current is prevented even if the storage battery systems 11 and 12 are connected in parallel with each other.

In addition, in the collective charging after the individual charging, when the control unit 21 determines that charging of any one of the plurality of batteries C101 to C103 of the storage battery system 11 and the plurality of batteries C201 to C203 of the storage battery system 12 is completed, the control unit 21 ends the collective charging of the plurality of storage battery systems 11 and 12. Here, as described above, when the individual charging is completed, the total voltage in each of the storage battery systems 11 and 12 is equal to the individual charging completion total voltage $V_{IT}$, and the remaining charge capacities of the batteries C101 to C103 and C201 to C203 are also equal to each other. Therefore, without polling all the batteries C101 to C103, C201 to C203, and the like, it can be determined that the charging is completed as a whole as long as the charging of one battery is confirmed as completed.

It goes without saying that the control unit 21 compares a current value acquired from a current sensor (not shown) of each of the systems 11 and 12 with a charging current limit value of each of the systems 11 and 12, and controls a charging current so that both of the current values do not exceed the limit value. In addition, since the charging current limit value of each of the systems 11 and 12 decreases as the charging progresses, it goes without saying that the charging current is controlled so as to be adjusted to this decrease.

Figure 3:
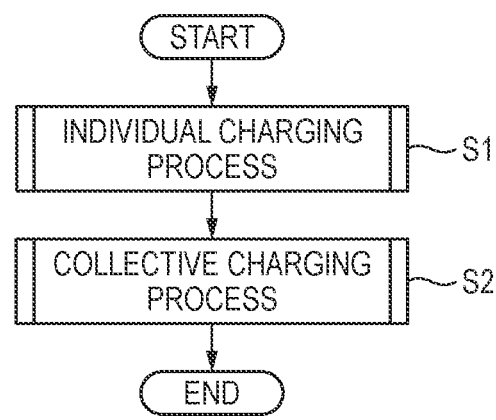
FIG. 3 is a main flowchart showing a charging control method according to the present embodiment.

Next, a charging control method according to the present embodiment will be described. FIG. 3 is a main flowchart showing a charging control method according to the present embodiment. First, as shown in FIG. 3, the control unit 21 executes an individual charging process (S1). In this process, as described above, the total voltage of each of the storage battery systems 11 and 12 is made equal to the individual charging completion total voltage $V_{IT}$, and the remaining charge capacity of the batteries C101 to C103 in the storage battery system 11 and the remaining charge capacity of the batteries C201 to C203 in the storage battery system 12 are made respectively equal to the system remaining charge predetermined capacity SRC (SRC1 or SRC2).

Thereafter, the control unit 21 executes a collective charging process (S2). The plurality of batteries C101 to C103 and C201 to C203 of all the storage battery systems 11 and 12 are charged together. Then, after the collective charging process is completed, the process shown in FIG. 3 ends.

Figure 4:
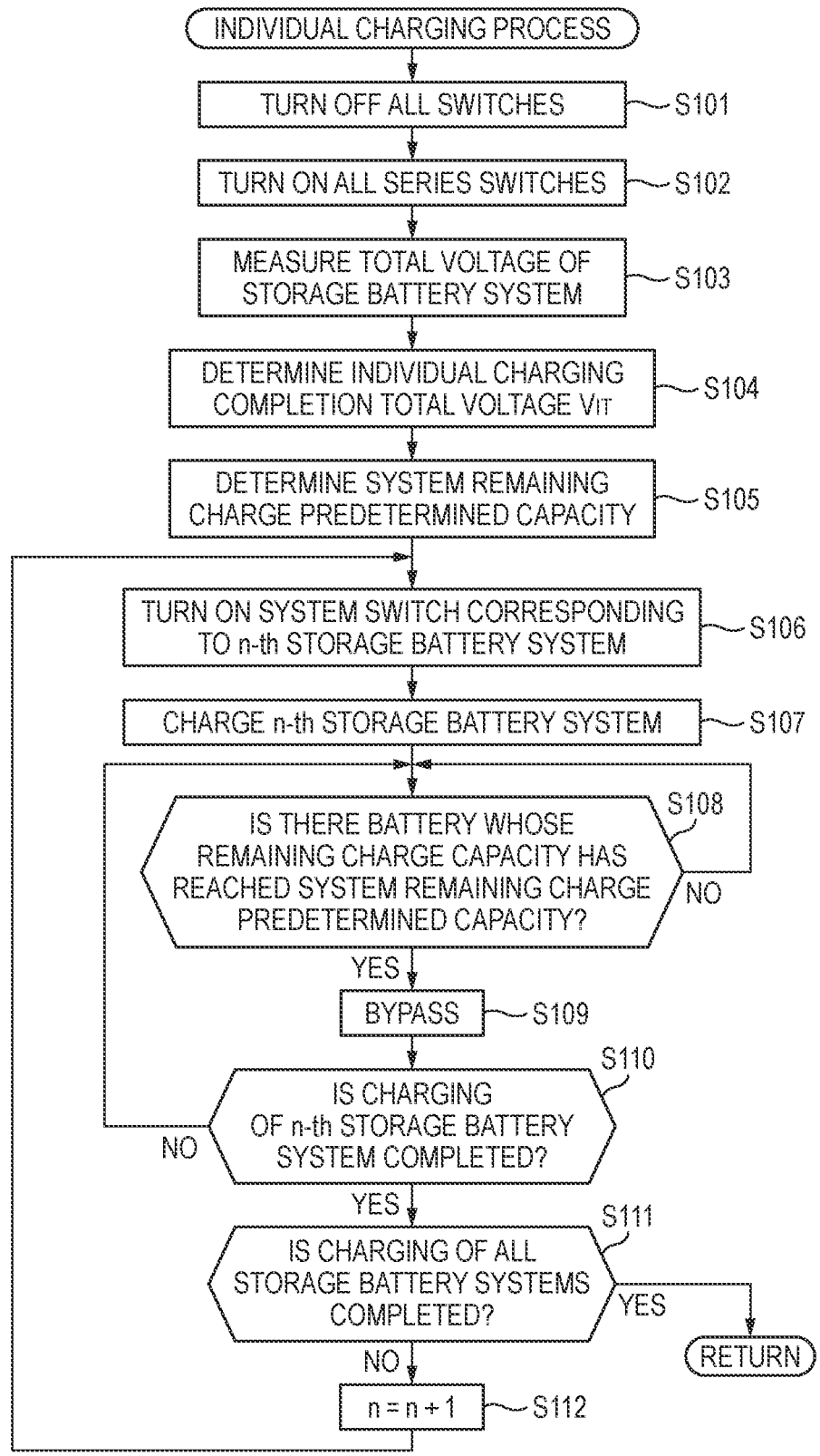
FIG. 4 is a sub flowchart showing details of an individual charging process shown in FIG. 3.

FIG. 4 is a sub flowchart showing details of the individual charging process shown in FIG. 3. As shown in FIG. 4, in the individual charging process, the control unit 21 first turns off all the switches S100, S200, S101a to S103a, S201a to S203a, S101b to S103b, and S201b to S203b (S101).

Next, the control unit 21 turns on all the series switches S101b to S103b and S201b to S203b (S102). Thereafter, the detection unit 22 of the charging control unit 20 measures the total voltage of each of the storage battery systems 11 and 12 (S103).

Next, the control unit 21 determines the individual charging completion total voltage $V_{IT}$ (S104). In this process, the control unit 21 determines the first minimum adjusted system total voltage $V_{AT1}$ based on the remaining charge capacities of each of the batteries C101 to C103 in the first storage battery system 11, and determines the second minimum adjusted system total voltage $V_{AT2}$ based on the remaining charge capacities of each of the batteries C201 to C203 in the second storage battery system 12. Then, the control unit 21 determines the higher one of the first minimum adjusted system total voltage $V_{AT1}$ and the second minimum adjusted system total voltage $V_{AT2}$ as the individual charging completion total voltage $V_{IT}$.

Next, the control unit 21 determines the system remaining charge predetermined capacity SRC (SRC1, SRC2) (S105). In this process, the control unit 21 determines the remaining charge capacity of each of the batteries C101 to C103 and C201 to C203 for reaching the individual charging completion total voltage $V_{IT}$ determined in step S104 as the system remaining charge predetermined capacity SRC. At this time, the control unit 21 calculates the correlation data shown in FIG. 2B based on the correlation data and the deterioration rate as shown in FIG. 2A, and determines the system remaining charge predetermined capacity SRC.

Thereafter, the control unit 21 selects a n-th storage battery system 11, 12, and turns on the system switch S100, S200 corresponding to the selected n-th storage battery system 11, 12 (S106). Here, n is a positive integer and is initially set as "1".

Next, the control unit 21 starts charging the n-th storage battery system 11, 12 selected in step S106 (S107). Thereafter, the control unit 21 determines whether there is a battery whose remaining charge capacity has reached the system remaining charge predetermined capacity SRC (SRC1, SRC2) determined in step S105 among the batteries C101 to C103 and C201 to C203 (S108).

When there is no battery whose remaining charge capacity has reached the system remaining charge predetermined capacity SRC (SRC1, SRC2) among the batteries C101 to C103 and C201 to C203 (S108: NO), this process is repeated until it is determined that there is a battery whose remaining charge capacity has reached the system remaining charge predetermined capacity SRC (SRC1, SRC2) among the batteries C101 to C103 and C201 to C203.

When there is a battery whose remaining charge capacity has reached the system remaining charge predetermined capacity SRC (SRC1, SRC2) among the batteries C101 to C103 and C201 to C203 (S108: YES), the control unit 21 turns off a corresponding one of the series switches S101$b$ to S103$b$ and S201$b$ to S203$b$ and turns on a corresponding one of the parallel switches S101$a$ to S103$a$ and S201$a$ to S203$a$ of the battery whose remaining charge capacity has reached the system remaining charge predetermined capacity SRC (SRC1, SRC2) among the batteries C101 to C103 and C201 to C203, so as to bypass the battery among the batteries C101 to C103 and C201 to C203 (S109).

Next, the control unit 21 determines whether the remaining charge capacities of all of the batteries C101 to C103 and C201 to C203 in the systems 11 and 12 have reached the system remaining charge predetermined capacity SRC (SRC1 and SRC2), that is, whether the charging of the n-th storage battery system 11, 12 is completed (S110). When the charging of the n-th storage battery system 11, 12 is not completed (S110: NO), the process proceeds to step S108.

When the charging of the n-th storage battery system 11, 12 is completed (S110: YES), the control unit 21 determines whether the charging of all the storage battery systems 11 and 12 is completed (S111). When the charging of all the storage battery systems 11 and 12 is not completed (S111: NO), the charging control unit 20 sets n as n+1 (S112), and the process proceeds to step S106.

On the other hand, when the charging of all the storage battery systems 11 and 12 is completed (S111: YES), the process shown in FIG. 4 is ended. As a result, the individual charging is completed.

Figure 5:
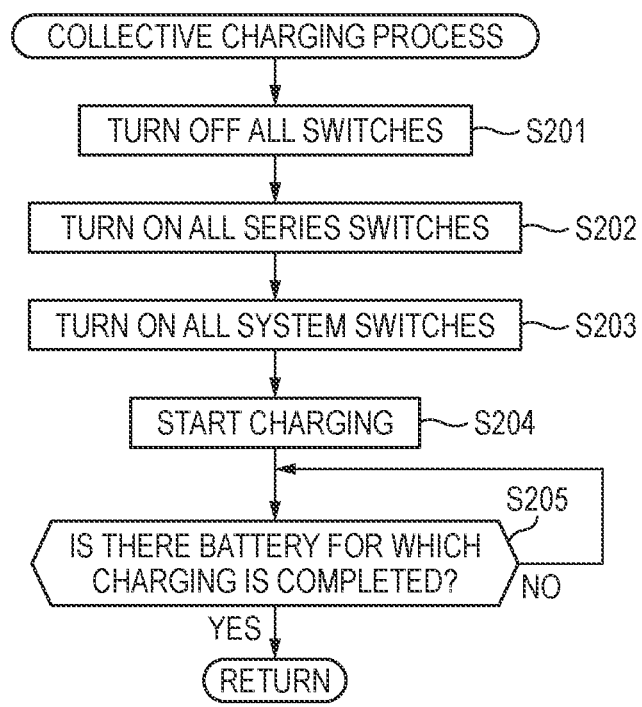
FIG. 5 is a sub flowchart showing details of a collective charging process shown in FIG. 3.

FIG. 5 is a sub flowchart showing details of the collective charging process shown in FIG. 3. As shown in FIG. 5, in the collective charging process, the control unit 21 first turns off all the switches S100, S200, S101$a$ to S103$a$, S201$a$ to S203$a$, S101$b$ to S103$b$, and S201$b$ to S203$b$ (S201).

Next, the control unit 21 turns on all the series switches S101$b$ to S103$b$ and S201$b$ to S203$b$ (S202). Thereafter, the control unit 21 turns on all the system switches S100 and S200 (S203).

Next, the control unit 21 starts charging (S204). As a result, the collective charge for all the storage battery systems 11 and 12 is started. Thereafter, the control unit 21 determines whether there is a battery for which charging is completed among the batteries C101 to C103 and C201 to C203 (S205).

When there is no battery for which charging is completed among the batteries C101 to C103 and C201 to C203 (S205: NO), this process is repeated until it is determined that there is a battery for which charging is completed among the batteries C101 to C103 and C201 to C203. When there is a battery for which charging is completed among the batteries C101 to C103 and C201 to C203 (S205: YES), the process shown in FIG. 5 ends.

As described above, according to the charging control unit 20, the battery system 1, and the charging control method of the present embodiment, the collective charging is executed after the remaining charge capacities of the plurality of batteries C101 to C103 forming the storage battery system 11 and the remaining charge capacities of the plurality of batteries C201 to C203 forming the storage battery system 12 are respectively made uniform to the system remaining charge predetermined capacities SRC1 and SRC2, and the batteries are individually charged to the individual charging completion total voltage $V_{IT}$. Therefore, after the remaining charge capacities of the storage battery systems 11 and 12 are made equal, the circulating current is kept within an acceptable current even if the battery system is unexpectedly switched to a discharge mode, and the problem of the circulating current due to bypassing the batteries C101 to C103 and C201 to C203 is less likely to occur even during the collective charging. Accordingly, it is possible to reduce a possibility that the circulating current cannot be accepted at the time of parallel connection in a case where the plurality of storage battery systems 11 and 12 in which the plurality of batteries C101 to C103 and C201 to C203 are connected in series are provided in parallel with each other.

Further, based on a battery having the smallest remaining charge capacity among the batteries C101 to C103 in the storage battery system 11 and among the batteries C201 to C203 in the storage battery system 12, the total voltage of the system 11 and of the system 12 when the other batteries C101 to C103 of the same system 11 and the other batteries C201 to C203 of the same system 12 are charged to the same remaining charge capacity as the batteries having the smallest remaining charge capacities is calculated as the minimum adjusted system total voltage $V_{AT1}$ and the minimum adjusted system total voltage $V_{AT2}$, and the higher value between the minimum adjusted system total voltages $V_{AT1}$ and $V_{AT2}$ respectively calculated for the storage battery systems 11 and 12 is set as the individual charging completion total voltage $V_{IT}$. Therefore, since the individual charging completion total voltage $V_{IT}$ is determined so that the individual charging ends most quickly in reality, it is possible to increase the possibility that the parallel operation can be performed at the time of an unexpected switch to the discharge mode.

In addition, the system remaining charge predetermined capacity SRC1 or SRC2 which is the target value of the remaining charge capacity of each of the plurality of batteries C101 to C103 and C201 to C203 for reaching the individual charging completion total voltage $V_{IT}$ is obtained, a battery among the batteries C101 to C103 or C201 to C203 whose remaining charge capacity has reached the system remaining charge predetermined capacity SRC1 or SRC2 is sequentially bypassed, and the individual charging in the system 11 or 12 is completed when the remaining charge capacities of all of the plurality of batteries C101 to C103 or C201 to C203 have reached the system remaining charge predetermined capacity SRC1 or SRC2. Therefore, even if there is a variation in the remaining charge capacity of each of the plurality of batteries C101 to C103 and C201 to C203, the variation can be adjusted.

Further, for each of the plurality of batteries C101 to C103 and C201 to C203, the remaining charge capacity to be achieved by each of the batteries C101 to C103 and C201 to C203 is obtained based on the deterioration rate, and the correlation data between the open circuit voltage and the remaining charge capacity, and is set as the system remaining charge predetermined capacity SRC. Therefore, it is possible to obtain an appropriate remaining charge capacity to be achieved in consideration of the deterioration rate in each of the storage battery systems 11 and 12.

In addition, when it is determined that charging of any one of the plurality of batteries C101 to C103 and C201 to C203 is completed when the collective charging is being performed, the collective charging of the plurality of storage battery systems 11 and 12 is ended. Specifically, in the collective charging, the remaining charge capacities of the plurality of batteries C101 to C103 and C201 to C203 are made uniform for each of the storage battery systems 11 and 12, so that the remaining charge capacities of all the batteries C101 to C103 and C201 to C203 in each of the storage battery systems 11 and 12 are equally reduced. In addition, since the storage battery systems 11 and 12 are connected in parallel with each other, the total voltages of the storage battery systems 11 and 12 are the same. Therefore, the charging of all the batteries C101 to C103 and C201 to C203 is completed at the same time. Therefore, it is not necessary to confirm the completion of charging of all the batteries C101 to C103 and C201 to C203, and it is possible to easily determine the completion of charging.

Although the invention has been described above based on the embodiment, the invention is not limited to the above embodiment, and modifications may be made or well-known techniques may be combined without departing from the scope of the invention.

For example, the first storage battery system 11 is first selected in the process of step S106 shown in FIG. 4, and the second storage battery system 12 is selected through the process of step S112, but the present invention is not limited thereto. For example, the system may be selected in order from one with the smallest system remaining charge predetermined capacity SRC (SRC1,SRC2) or the one with the largest system remaining charge predetermined capacity SRC (SRC1,SRC2).

In the above embodiment, two storage battery systems 11 and 12 are provided, but three or more storage battery systems may be provided. Further, the number of the batteries C101 to C103 forming the storage battery system 11 and the batteries C201 to C203 forming the storage battery system 12 is three, but the number may be two or four or more. Further, the batteries C101 to C103 and C201 to C203 may be unit cells or may be modules including a plurality of unit cells.

What is claimed is:

1. A charging control device configured to charge a battery device,
the battery device comprising:
a battery group including a first storage battery system in which a plurality of first batteries are connected in series with each other and a second storage battery system in which a plurality of second batteries are connected in series with each other, the first and second storage battery systems being connected in parallel with each other;
a plurality of system switches each configured to electrically connect and disconnect one of the first and second storage battery systems to and from the charging control device; and
a plurality of bypass switches each configured to bypass each of the plurality of first and second batteries,
the charging control device comprising:
a control device configured to control the system switches and the bypass switches to control charging of the battery device, wherein the control device is configured to:
determine an individual charging completion total voltage being a total voltage as a common charging target for both the first and second storage battery systems;
obtain a first system remaining charge predetermined capacity being a target value of a remaining charge capacity of each of the plurality of first batteries and a second system remaining charge predetermined capacity being a target value of a remaining charge capacity of each of the plurality of second batteries, for each of total voltages of the first and second storage battery systems to reach the individual charging completion total voltage;
charge each of the first and second storage battery systems individually such that each of the total voltages of the first and second storage battery systems reaches the individual charging completion total voltage while making the remaining charge capacities of each of the plurality of first and second batteries uniform to be respective one of the first and second system remaining charge predetermined capacities; and
perform collective charging of the first and second storage battery systems together after charging each of the first and second storage battery systems individually.

2. The charging control device according to claim 1, wherein the control device is configured to:
calculate, based on a remaining charge capacity of a first battery of the plurality of first batteries having a smallest remaining charge capacity among all of the plurality of first batteries, a first minimum adjusted system total voltage being the total voltage of the first storage battery system when the other first batteries than the first battery are charged to reach the same remaining charge capacity as the first battery having the smallest remaining charge capacity, and based on a remaining charge capacity of a second battery of the plurality of second batteries having a smallest remaining charge capacity among all of the plurality of second batteries, a second minimum adjusted system total voltage being the total voltage of the second storage battery system when the other second batteries than the second battery are charged to reach the same remaining charge capacity as the second battery having the smallest remaining charge capacity; and
determine that one of the first and second minimum adjusted system total voltages having a highest value is the individual charging completion total voltage.

3. The charging control device according to claim 1, wherein the control device is configured to: bypass any first battery of the plurality of first batteries whose remaining charge capacity has reached the first system remaining charge predetermined capacity; and to complete, when all of the plurality of first batteries have reached the first system remaining charge predetermined capacity, individual charging of the first storage battery system, and
wherein the control device is configured to: bypass any second battery of the plurality of second batteries whose remaining charge capacity has reached the second system remaining charge predetermined capacity; and to complete, when all of the plurality of second batteries have reached the second system remaining charge predetermined capacity, individual charging of the second storage battery system.

4. The charging control device according to claim 3, wherein the control device is configured to: obtain, for each of the plurality of first and second batteries, a remaining charge capacity to be reached by each of the first and second batteries based on a deterioration rate and correlation data between an open circuit voltage and a remaining charge capacity; and determine that the obtained remaining charge capacity is the first and second system remaining charge predetermined capacities.

5. The charging control device according to claim 3, wherein the control device is configured to end the collective charging of the first and second storage battery systems in a case where the control unit determines that charging of any one of the plurality of first and second batteries is completed while the first and second storage battery systems are being collectively charged.

6. A battery system comprising:
the charging control device according to claim 1; and
a battery device comprising: a battery group including a first storage battery system in which a plurality of first batteries are connected in series with each other and a second storage battery system in which a plurality of second batteries are connected in series with each other, the first and second storage battery systems being connected in parallel with each other; a plurality of system switches each configured to electrically connect and disconnect one of the first and second storage battery systems to and from the charging control device; and a plurality of bypass switches each configured to bypass each of the plurality of first and second batteries.

7. A charging control method for a charging control device configured to charge a battery device, the battery device comprising:
a battery group including a first storage battery system in which a plurality of first batteries are connected in series with each other and a second storage battery system in which a plurality of second batteries are connected in series with each other, the first and second storage battery systems being connected in parallel with each other;
a plurality of system switches each configured to electrically connect and disconnect one of the first and second storage battery systems to and from the charging control device; and
a plurality of bypass switches each configured to bypass each of the plurality of first and second batteries,
the charging control method including:
controlling the system switches and the bypass switches to control charging of the battery device,
wherein the controlling includes:
determining an individual charging completion total voltage being a total voltage as a common charging target for both the first and second storage battery systems;
obtaining a first system remaining charge predetermined capacity being a target value of a remaining charge capacity of each of the plurality of first batteries and a second system remaining charge predetermined capacity being a target value of a remaining charge capacity of each of the plurality of second batteries, for each of total voltages of the first and second storage battery systems to reach the individual charging completion total voltage;
charging each of the first and second storage battery systems individually such that each of the total voltages of the first and second storage battery systems reaches the individual charging completion total voltage while making the remaining charge capacities of each of the plurality of first and second batteries uniform to be respective one of the first and second system remaining charge predetermined capacities; and
after the charging of each of the first and second storage battery systems individually, performing collective charging of the first and second storage battery systems together.

* * * * *